United States Patent Office 3,469,692
Patented Sept. 30, 1969

3,469,692
USE OF ORGANIC DITHIOLS AS
FLOTATION REAGENTS
Wilfred Lawson Freyberger, Houghton, Mich., assignor to American Cyanamid Company, Stamford, Conn., a corporation of Maine
No Drawing. Filed Nov. 18, 1966, Ser. No. 595,343
Int. Cl. B03d 1/00
U.S. Cl. 209—166                                    5 Claims

ABSTRACT OF THE DISCLOSURE

When the froth flotation of zinc from zinc-containing ores is carried out in the presence of a dithiol of the formula HS—R—SH, wherein R is a hydrocarbon radical of from 6 to 18 carbon atoms, such as p-menthane-2,9-dithiol, a substantial reduction in the required amounts of copper sulfate and lime conditioning agents is realized and, in some instances, the need for these agents is eliminated entirely.

---

This invention relates to the beneficiation of base metal ores for the recovery of metal values therefrom. More particularly, it relates to the use of a new class of flotation promoters for the collection of lead, copper and zinc from sulfide ores, oxide ores and oxidized ores containing these metals. Still more particularly, the present invention relates to the use of an organic dithiol as a flotation promoter for the recovery of lead, copper and zinc from ores containing one or more of these metals.

It is conventional to beneficiate ores by flotation procedures using a flotation promoter which causes the selective flotation of desired mineral values without similarly causing the flotation of undesired mineral values. Generally, froth flotation involves the formation of an aqueous suspension of the finely ground ore material, addition to this suspension of a frothing agent and a flotation promoter, and agitation of the mixture until it is topped with a froth. The desired metal values are collected from the froth. This frothing process may be repeated to increase the percentage of recovery of the desired metal and to produce concentrates of higher metal content. Depending upon the nature of the specific ore and the metal which is being collected, the addition of other materials and the use of other procedures may also be necessary. For example, ores which are acidic often must be treated with an alkaline material such as lime to raise the pH of the flotation suspension since most promoters, for example, the widely used xanthate and dithiophosphate promoters, operate more efficiently at pH's in the range of above 10. Such is particularly the case in the treatment of copper and zinc ores. Attainment of such pH requires the addition of a basic material such as lime. Ores very often contain iron, and pH values above 10 are generally required to prevent its flotation with the conventional flotation promoters. The flotation concentrates as presently obtained are, however, often contaminated by a high proportion of iron. This iron content causes a significant problem during the smelting of the ore concentrate. The iron reduces the capacity ofo the smelting furnace, interferes with smelting operations and causes shutdowns for clean-outs and repairs. It is therefore important to obtain ore concentrates as free of iron as possible and this has been extremely difficult using the conventional xanthate and dithiophosphate promoters.

Using the conventional flotation promoters for the collection of zinc values from ores containing zinc, it is necessary to add a material which provides heavy metal ions such as copper ions in the flotation system, since zinc is not collected efficiently by these promoters unless such ions are present. Many copper containing ores do not generate copper ions in the aqueous flotation pulp so a copper salt such as copper sulfate must be added to the pulp. Normally about 0.1–0.2 pound of copper sulfate is added to the flotation suspension for each percent of zinc per ton of ore. The requirement for copper ions is thus an item of considerable importance in the cost of zinc recovery.

Attempts have been made to modify prior art practices whereby the requirement for lime could be reduced and collection of metal values from ores could be made at lower pH levels while preventing iron from flotating with the desired metal values. Similarly, it has been recognized that it would be of great advantage to collect zinc by flotation without the need for the presence of copper ions in the flotation suspension. Until the present invention, these problems have not been solved to a satisfactory extent.

It is an object of the present invention to provide a method and means for floating base metals at pH levels which require the addition of less alkaline material and are also less conducive to the concomitant flotation of iron with the desired metal values. It is a further object of the present invention to provide a method and means whereby zinc can be floated without the need for large concentrations of copper ions in the flotation suspension, thereby saving a large part of the cost of adding such materials as copper sulfate in the flotation operation.

In accordance with the present invention, it has been discovered that organic dithiols are extremely efficient flotation promoters for the collection of metal values from base metal ores. The dithiols which are useful in accordance with the present invention are represented by the formula:

HS—R—SH wherein R is an organic moiety of from 6 to 18 carbon atoms. Among the useful aliphatic dithiols, there can be named 1,6-hexanedithiol, 1,8-octanedithiol, 1,9-nonanedithiol, 1,12-dodecanedithiol, 1,14-tetradecanedithiol, 1,2-hexanedithiol, 1,2-tetradecanedithiol and 2,5-dimethylhexane-2,4-dithiol. Among the useful alicyclic, aralkyl, alkaryl or aryl dithiols there can be named dipentenedithiol (i.e., p-menthane-2,9-dithiol), ethyl cyclohexyl-2(or 3),8-dithiol, phenyl-1,2-ethanedithiol, 1,2-cyclohexanedithiol, 1,4-di($\beta$ - mercaptoethyl)benzene, naphthalenedithiols, 4,4'-methylenedibenzenedithiol and ethylidenedibenzenedithiol.

A highly useful class of dithiols which can be employed effectively as flotation promoters are cyclic dithiols. Such compounds may be prepared by reacting hydrogen sulfide with unsaturated terpene compounds including cyclic and unsymmetrical bicyclic terpenes or mixtures of such compounds. Representative samples of such terpene compounds include isomerized $\alpha$-pinene, dipentene, 1,$\Delta^{8-9}$-methadiene, $\alpha$-terpinene, $\gamma$-terpinene, $\alpha$-phellandrene, $\beta$-phellandrene, terpinolene, 3,$\Delta^{8-9}$-methadiene, sylvestrene (derivative of methmenthane), cadiene (bicyclic sesquiterpene), $\alpha$-selinene (bicyclic sesquiterpene), $\Delta^{1-7}$ - 3 - menthadiene ($\beta$-terpinene), $\Delta^{1-7}$, $\Delta^{8-9}$-methadiene, and the like.

Any of the foregoing compounds can be substituted with aryl radicals, alkaryl or aralkyl radicals. Preferred dithiols are aliphatic and alicyclic compounds having 8 to 12 carbon atoms. Among such preferred compounds there can be named 2,5-dimethylhexanedithiol-2,4 and p-menthane-2,9-dithiol.

The actual flotation procedures to be followed in using the promoters of the present invention are generally similar to those followed using known promoters. The ore material must be reduced to a finely divided state and suspended in an aqueous medium containing a frothing agent and the promoter. One difference in practicing the present invention as compared with following known flotation procedures results from the ability of the promoters of the present invention to effectively collect the desired mineral values at relative low pH ranges. Thus, it is often not necessary to add an alkaline material to raise the natural pH of the ore suspension. The promoters of the present invention are quite effective at a pH in the range of about 7.0 to about 10. High grade concentrates and excellent recoveries can be obtained by conducting the flotation with the promoter of the present invention in a pH range of about 7.0 to about 9.5, and preferably in the range of 7.5 to 9.0.

Advantageously, there is one further difference in conducting a flotation operation in accordance with the present invention. When it is desired to recover zinc, it is not necessary to condition the ore material by the addition of the usual large concentrations of copper ions in the form of copper sulfate. As has been stated above, the promoters of the present invention are capable of giving high recoveries of zinc in the form of high grade concentrates with much less than normal requirements of copper sulfate and, in some cases, in the total absence of copper sulfate.

If the ore material which is being beneficiated is a simple ore bearing only one desired metal such as either lead, copper or zinc, there is no problem in collecting the metal values by conventional procedures. If the ore material is more complex and contains, for example, either lead or copper and zinc, the lead or copper should be recovered before it is attempted to recover the zinc. This is accomplished normally by adding a material which deactivates zinc so that either the lead or copper can be floated separately. The lead or copper can be collected using either the promoters of the present invention or any of the conventional xanthate or dithiophosphate promoters. After the lead or copper has been collected, the zinc can be recovered from the tailings using the promoters of the present invention. If the ore material contains, for example, lead, copper and zinc, each of these metals can be collected separately by first floating lead, for example, using a xanthate or dithiophosphate promoter and a depressant for the copper and zinc which then are selectively separated. Copper can be floated at low pH values using the collectors of the present invention or else the pH can be raised to a level of about 10 to 11, and the copper can be collected with a conventional xanthate or dithiophosphate flotation promoter. The zinc containing tailings from the copper flotation then can advantageously be floated using the dithiol flotation promoters of the present invention at a pH in the range of about 7.5 to about 9.5 as above noted.

These illustrations of procedures which can be followed in beneficiating lead, copper and zinc bearing ores can, of course, be modified in many ways, as will be apparent to those skilled in the art. The order of collecting the various mineral values in an ore can be varied to fit the particular needs. The collectors of the present invention can be used individually or can be used in combination with each other or with known collectors such as xanthates or dithiophosphates. Auxiliary substances such as depressants and frothing agents can be added as desired and necessary. Concentrations of reagents can be varied to meet the requirements of the particular ore and the desired percentage of recovery and grade level of the concentrate. In the case of the collection of zinc, the use of copper sulfate is optional, since the collector of the present invention is capable of yielding a zinc concentrate even in the absence of copper sulfate.

The following examples are presented to further illustrate the present invention.

EXAMPLE 1

A lead-zinc ore from the northwestern part of the United States, containing galena, sphalerite and marmatite (about 0.5% Pb, 2% Zn, 0.5% Fe), was ground and floated to remove the lead in a Fagergren flotation machine in the presence of 0.6 pound/ton sodium carbonate, 0.12 pound/ton technical grade dicresyldithiophosphoric acid containing about 6% thiocarbanilide and 0.01 pound/ton cresylic acid.

Samples of these tailings were used in the following experiments:

(A) One sample of the tailings from the lead flotation was mixed with 0.075 pound/ton methylisobutyl carbinol as frother and 0.065 pound/ton potassium ethyl xanthate as promoter and the zinc floated to give a concentrate, assaying 5.1% Zn and representing a zinc recovery of 19.5%. The time of the zinc flotation was 4 minutes.

(B) A second portion of the lead tailing was treated as in Part A except that 0.06 pound/ton of p-menthanedithiol was used as promoter in place of the xanthate. By this treatment, 95.0% of the zinc was recovered in a concentrate assaying 37.2% Zn, thus demonstrating the superior efficiency of the p-menthanedithiol as a zinc promoter.

EXAMPLE 2

A zinc ore from the southeastern part of the United States, containing spalerite (about 8% Zn), was ground and floated for 3 minutes with 0.16 pound/ton p-menthanedithiol as promoter. The zinc concentrate thus produced contained 51.1% Zn and represented a recovery of 97.0% of the zinc contained in the ore. Copper sulfate, which is normally used in quantities of 1.0 lb./ton as an activator, was not employed in this treatment.

EXAMPLE 3

(A) A lead-zinc ore from the tri-State district of the United States, containing galena, sphalerite, marmatite and pyrite (0.8% Pb, 3% Zn, 7% Fe), was ground with 0.05 pound/ton sodium cyanide and floated to remove lead with 0.06 pound/ton technical grade ammonium dicresyldithiophosphate containing 6% thiocarbanilide and 0.1 pound/ton pine oil. The pH of the tailings from the lead flotation was adjusted to 9.5 by the addition of 1.0 pound/ton calcium hydroxide. Copper sulfate pentahydrate as zinc activator, 0.5 pound/ton, and technical grade sodium diethyldithiophosphate as promoter, 0.05 pound/ton, were added along with 0.12 pound/ton pine oil as frother and the zinc floated for 5 minutes. These reagents are those in regular use in the flotation of this ore. The resulting zinc concentrate contained 25.8% Zn and represented a recovery of 91.6% of the zinc.

(B) A second portion of this ore was treated as in part A except that in the zinc flotation operation the copper sulfate dosage was reduced to 0.1 pound/ton. Flotation of the zinc produced a concentrate which assayed 24.4% Zn and represented a recovery of only 20.2% of the zinc. Thus, using a conventional dithiophosphate promoter, a marked reduction in the zinc recovery results if the copper sulfate dosage is reduced.

(C) A third portion of this ore was treated as in part A except that in the zinc flotation no calcium hydroxide was added, 0.1 pound/ton copper sulfate was used and 0.05 pound/ton p-menthanedithiol was used in place of the sodium diethyldithiophosphate. Flotation of the zinc produced a concentrate assaying 32.4% Zn and representing a recovery of 96.5% of the contained zinc. The lime ordinarily added to inhibit pyrite flotation so as to prevent dilution of the zinc concentrate was not needed.

(D) A fourth portion of this ore was treated as in part A except that in the zinc flotation operation neither lime nor copper sulfate were used and 0.04 pound/ton p-menthanedithiol was added. The zinc was floated giving a concentrate which assayed 22% Zn, representing a zinc recovery of 92.9%.

The above data indicate that p-menthanedithiol is an efficient promoter for zinc minerals from the standpoint of copper sulfate requirements. Excellent recoveries are obtained with reduced copper sulfate dosages or in the absence of copper sulfate. It will be noted that with only 0.1 pound/ton copper sulfate, both the grade of the zinc concentrate and the recovery of zinc were considerably higher than in the operation of part A which represents standard practice with this ore.

EXAMPLE 4

(A) A zinc ore from the southeastern part of the United States, containing about 7-8% Zn as sphalerite, was ground, conditioned with 0.9 pound/ton copper sulfate pentahydrate as zinc activator, 0.1 pound/ton technical grade sodium diethyldithiophosphate as promoter and 0.12 pound/ton pine oil as frother, and floated in a Fagergren flotation machine for 3 minutes. The zinc recovery was 97.4% in a concentrate assaying 51.3% Zn. This treatment represents standard practice on this ore.

(B) A second portion of this ore was treated identically except that the copper sulfate dosage was reduced to 0.2 pound/ton. Only 55.8% of the zinc was recovered in a concentrate assaying 47.6% Zn. Thus, the reduction in the copper sulfate dosage resulted in a marked decrease in the grade of the concentrate and in the percent of zinc recovered.

(C) A third portion of this ore was treated as in part A except that only 0.2 pound/ton copper sulfate was used and 0.1 pound/ton of p-menthanedithiol as promoter was added. Zinc recovery was 97.4% in a concentrate assaying 55.8% Zn. This demonstrates the effectiveness of p-menthanedithiol as a zinc promoter even in the absence of large amounts of copper sulfate.

EXAMPLE 5

Three identical portions of a lead-zinc ore from the western United States, containing about 0.5% lead and 2% zinc as galena, sphalerite and marmatite, were ground and floated to remove the lead in the presence of sodium carbonate, dicresyldithiophosphoric acid containing a small percentage of thiocarbanilide, and cresylic acid. The three identical tailings thus produced were treated as follows:

(A) The first portion was conditioned was 0.45 pound/ton copper sulfate as zinc activator, 0.065 pound/ton potassium ethyl xanthate as promoter, and 0.08 pound/ton methylamyl alcohol as frother, and a zinc concentrate then removed by flotation. In this concentrate, 92.3% of the zinc was recovered; the concentrate assayed 40.6% zinc. The flotation time was 4 minutes.

(B) The second portion was treated identically except that the dosage of copper sulfate was reduced to 0.1 pound/ton. Zinc flotation produced a concentrate assaying 26.5% Zn and representing a zinc recovery of 93.5%. It will be noted that a marked reduction in the grade of the zinc concentrate occurred in this treatment.

(C) The third portion was treated by the procedure of part A except that the copper sulfate dosage was reduced to 0.1 pound/ton and 0.06 pound/ton p-menthanedithiol as promoter was added. Subsequent zinc flotation produced a concentrate assaying 42.7% zinc and representing a zinc recovery of 95.1%. In this treatment with p-menthanedithiol, both the zinc content and the grade of the zinc concentrate were improved over what is obtained with the standard xanthate promoter.

EXAMPLE 6

An Australian lead-zinc ore, containing about 12% Pb and 10% Zn as galena and marmatite, was ground and conditioned with 0.08 pound/ton sodium ethyl xanthate as promoter and 0.005 pound/ton methylisobutylcarbinol as frother and the lead removed by flotation.

The lead tailings were used in the following experiments:

(A) Copper sulfate pentahydrate, 1.0 pound/ton, sodium ethyl xanthate as promoter, 0.06 pound/ton, and cresylic acid as frother, 0.01 pound/ton, were added to one portion of the tailings and the zinc floated for 20 minutes. The zinc concentrate thus produced assayed 50.1% Zn and represented a zinc recovery of 81.6%.

(B) A second portion of the tailings was treated as in part A except that the copper sulfate dosage was reduced to 0.25 pound/ton. Zinc flotation produced a concentrate assaying 46.8% zinc. The zinc recovery was only 56.9%.

(C) A third portion of the lead tailing was treated as in part A except that the copper sulfate dosage was reduced to 0.25 pound/ton and the xanthate promoter was replaced by 0.06 pound/ton p-menthanedithiol as promoter. Zinc flotation produced a concentrate assaying 50.1% Zn and a zinc recovery of 83.4%.

The treatment used on the first portion of the tailings represents standard practice. Reduction of the copper sulfate dosage with the standard xanthate promoter resulted in decreased efficiency. As shown in part C, zinc recovery improved with p-menthanedithiol as a promoter even when reduced copper sulfate dosage was employed.

EXAMPLE 7

Two portions of a lead-zinc ore from the northeastern United States, containing about 0.4% Pb, 10% Zn and 10% Fe as galena, sphalerite, marmatite and pyrite, were ground and floated to remove lead in the presence of 0.06 pound/ton sodium cyanide, 0.12 pound/ton dicresyldithiophosphoric acid containing a small percentage of thiocarbanilide, and 0.05 pound/ton pine oil.

(A) The lead tailings from the first portion were conditioned with 2.8 pound/ton calcium hydroxide, 1.2 pound/ton copper sulfate pentahydrate and 0.12 pound/ton sodium ethyl xanthate and floated for 3 minutes to produce a zinc concentrate which assayed 45.8% Zn and represented a zinc recovery of 96.8%. This treatment represents standard flotation practice on this ore and the use of the lime is necessary to inhibit the flotation of the pyrite in the ore.

(B) The lead tailings from the second portion of the ore were treated with 0.3 pound/ton copper sulfate and 0.1 pound/ton p-menthane dithiol as promoter. No lime was added. Subsequent flotation resulted in the recovery of a zinc concentrate of the quantity and grade obtained as described in part A of this example. Thus, with p-menthanedithiol as promoter it was possible not only to operate at reduced dosages of copper sulfate but also to omit the use of lime, thus demonstrating the selectivity of p-menthanedithiol as a zinc promoter.

EXAMPLE 8

Three portions of a lead-zinc ore from the southwestern United States, containing galena, sphalerite, marmatite and pyrite and assaying about 2% lead and 6% zinc, were ground in the presence of 0.1 pound/ton sodium cyanide, 0.05 pound/ton zinc sulfate heptahydrate, a promoter combination of 0.04 pound/ton of a mixture of sodium diisobutyldithiophosphate and mercaptobenzothiazole and 0.03 pound/ton sodium secondary-butyl xanthate, and 0.05 pound/ton cresylic acid as frother. The mixture was floated to remove lead and the lead tailings were treated as follows:

(A) To one sample of the tailings, 3.0 pound/ton calcium hydroxide were added to give a pH of 11.2. Copper sulfate pentahydrate, 1.0 pound/ton, potassium ethyl xanthate promoter, 0.09 pound/ton, and pine oil as frother, 0.1 pound/ton, were then added and the zinc floated to give a concentrate assaying 21.3% Zn and representing a recovery of 95.5% of the zinc. The flotation time was 7 minutes.

(B) The second sample of lead tailings was treated as in part A of this example except that the copper sulfate dosage was reduced to 0.25 pound/ton. Subsequent zinc flotation gave a concentrate of low grade, assaying only 8.3% zinc and representing a recovery of 96.9% of the zinc. Thus, very poor selectivity was obtained with the known promoter when the copper sulfate concentration was reduced.

(C) The third sample of the tailings was treated as follows: No lime was added; the pH was 7.8; copper sulfate dosage was 0.25 pound/ton and 0.09 pound/ton p-menthanedithiol was added as zinc promoter. Subsequent zinc flotation gave the same percent recovery of zinc to that obtained by the procedure of part A of this example, but the grade of the concentrate was raised to 29.1% zinc. This demonstrates the capacity of p-menthanedithiol to float zinc even with low copper sulfate usage and to produce zinc concentrate of higher grade.

EXAMPLE 9

This example illustrates the flotation of lead-zinc ore for the recovery of zinc, using various collectors, including a known xanthate collector for purposes of comparison. Copper sulfate was used in varying amounts and collections were made at different pH values. The concentrates obtained by these collection procedures were assayed for zinc and iron contents.

The general procedure used for each of the samples was to first grind the sample to the desired mesh size in the presence of cyanide to depress zinc. Lead was floated, and the lead tailings were then treated with collectors and copper sulfate in the concentrations and at the pH noted in the following table. The various concentrates were assayed for zinc and iron content, and the results are reported in the following table.

Flotation procedure 600 grams of —28 mesh ore assaying 0.35% lead, 10.2% zinc and 10.4% iron, was ground for 5 minutes at 63% solids to —48 mesh in the presence of 0.06 pound of sodium cyanide per ton of ore. To the suspension of finely ground ore was added 0.07 pound of a mixture of dicresyldithiophosphoric acid and thiocarbanilide and 0.048 pound of pine oil per ton. The mixture was conditioned for 2 minutes and then floated for 4 minutes at a pH of 8.4.

The tailings from the lead flotation were then floated for the recovery of zinc by the following procedure. The pH of the tailings was adjusted to the values stated in the table by the addition of either lime or sulfuric acid, depending upon the desired pH. No lime or acid was added if pH adjustment was not required. Copper sulfate pentahydrate was added, and this was followed by conditioning for 3 minutes, addition of the collector, and further conditioning for 3 minutes. The suspension was floated for 3 minutes. Assays for zinc and iron were made and are reported in the following table.

EXAMPLE 10

This example illustrates the flotation of a zinc ore (9.6% Zn), using the collectors of the present invention without added copper sulfate.

The test samples were prepared by grinding 600 grams of —10 mesh ore for 6 minutes at 60% solids. The collector was added to the grinding operation. Pine oil, 0.082 pound per ton of ore, was added, the mixture conditioned for 2 minutes, and floated for 5 minutes. The pH during the flotation was about 9. The amount of zinc recovered with each collector is noted in the following table.

FLOTATION OF ZINC ORE

| | | Assay Percent Zn | | |
|---|---|---|---|---|
| Run No. | Collector, lb./ton | Rougher Conc. | Tail | Rec., percent Zn |
| 1 | p-Menthane-2,9-dithiol: (a) 0.095. | 51.4 | 0.20 | 98.3 |
| 2 | 1,8-octanedithiol: (a) 0.19 | 49.3 | 0.15 | 98.8 |
| 3 | Mixture of ethylcyclohexyl (and 3), 8-dithiols: | | | |
| | (a) 0.092 | 52.0 | 0.32 | 97.2 |
| | (b) 0.18 | 49.1 | 0.15 | 98.8 |
| 4 | 2,5-dimethyl-hexanedithiol-2,4: (a) 0.18. | 48.9 | 0.40 | 96.5 |

EXAMPLE 11

This example demonstrates the ability of the flotation promoters of the present invention to collect copper from a copper bearing ore to yield a good grade concentrate which is relatively low in iron contamination. The ore assayed 1.5% copper and 1.33% iron.

600-gram samples of —28 mesh ore were ground for 8 minutes at 62% solids with slaked lime until the material was —48 mesh in size. Collector was added; the mixture conditioned for 4 minutes; 0.07 pound of frothing agent per ton of ore added; the mixture again was conditioned for one minute. The frothing agent was a mixture in equal parts by volume of pine oil and polypropylene glycol. The conditioned ore was floated for 5 minutes. The results of the assays are reported in the following table.

FLOTATION OF COPPER ORE

| Collector, lb./ton | CaO, lb./ton | pH | Assay, percent Cu | | Rec., percent | |
|---|---|---|---|---|---|---|
| | | | Rougher Conc. | Tail | Cu | Fe |
| 2,5-dimethyl hexanedithiol-2,4: | | | | | | |
| (a) 0.037 | 0.20 | 7.9 | | 0.258 | [1] 84 | [1] 30 |
| (b) 0.074 | 0.20 | 7.7 | 15.3 | 0.258 | 84.8 | 36.1 |

[1] Recovery of iron and copper estimated from tailing assay and weight and head assay and weight.

The above copper recoveries are equivalent to those obtained in standard practice on this ore with equal amounts of sodium isopropyl xanthate as collector. However, the xanthate collector requires the use of 1.30 lb./ton CaO and produces a copper concentrate of much

FLOTATION OF LEAD-ZINC ORE

| Run No. | Collector, lb./ton | CuSO₄.5H₂O, lb./ton | Ca(OH)₂, lb./ton | pH | Assay, percent Zn | | | Rec., percent Zn | | Rec., percent Fe | |
|---|---|---|---|---|---|---|---|---|---|---|---|
| | | | | | Cleaner Conc. | Rougher Conc. | Rougher Tail | Cleaner Conc. | Rougher Conc. | Cleaner Conc. | Rougher Conc. |
| 1 | Sodium ethyl xanthate: | | | | | | | | | | |
| | (a) 0.12 | 0.30 | 2.8 | 11.8 | | 53.9 | 5.73 | | 56.8 | | |
| | (b) 0.12 | 0.60 | 2.8 | 11.8 | | 36.8 | 0.40 | | 93.3 | | 47.0 |
| | (c) 0.12 | 1.2 | 2.8 | 11.7 | 57.1 | 40.0 | 0.55 | 87.3 | 92.5 | 11.0 | 29.2 |
| 2 | 2,5-dimethyl hexanedithiol-2,4: | | | | | | | | | | |
| | (a) 0.10 | 0.60 | 0.0 | 8.0 | 59.1 | 54.0 | 0.75 | 88.7 | 91.2 | 7.5 | 8.8 |
| | (b) 0.12 | 0.60 | 0.0 | 7.9 | 58.3 | 53.8 | 0.65 | 90.3 | 91.7 | 8.3 | 9.7 |
| | (c) 0.15 | 0.60 | 0.0 | 8.0 | 57.7 | 53.7 | 0.55 | 91.4 | 92.7 | 8.4 | 9.8 |
| 3 | p-Menthane-2,9-dithiol: | | | | | | | | | | |
| | (a) 0.11 | 0.30 | 0.0 | 7.8 | | 46.6 | 0.65 | | 91.3 | | 17.1 |
| | (b) 0.14 | 0.30 | 0.0 | 8.0 | | 38.6 | 0.50 | | 92.6 | | 39.1 |
| 4 | 1,8-octane-dithiol: | | | | | | | | | | |
| | (a) 0.15 | 0.60 | 0.0 | 8.0 | | 45.0 | 0.50 | | 92.0 | | 22.8 | higher iron content (52.3%). Thus, the dithiol promoters of the present invention are capable of performing their function at a relatively low pH, thereby avoiding the requirements for large amounts of alkaline materials. It can be further noted that the dithiols of the present invention are much more selective for copper than the known xanthates and are thus able to yield concentrates which are less contaminated with iron.

EXAMPLE 12

This example illustrates the beneficiation of a copper ore (0.88% copper and 3.0% iron), using the dithiol promoters of the present invention.

500 grams of −10 mesh ore were ground for 6 minutes at 59% solids to −65 mesh. Collector was added to the flotation cell and the mixture was conditioned for 1 minute. 0.14 pound of pine oil per ton of ore was added, followed by conditioning for an additional minute and flotation for 5 minutes. Assays of the flotation concentrates are reported in the following table.

| Run No. | Collector lb./ton | NaCN, lb./ton | Ca(OH)$_2$, lb./ton | pH | Assay, Percent Cu Rougher Conc. | Tail | Rec., Percent Cu | Fe |
|---|---|---|---|---|---|---|---|---|
| 1 | 2,5-dimethyl hexane-dithiol-2,4: (a) 0.030. | 0.00 | 0.88 | 7.5 | 12.9 | 0.113 | 88.3 | 23.5 |
| 2 | p-Menthane-2,9-dithiol: (a) 0.057. | 0.00 | 0.88 | 7.5 | 11.2 | 0.107 | 88.3 | 27.2 |

The above results are equivalent to those obtained on this ore with the dicresyldithiophosphate collector which is used in standard practice and which requires the auxiliary use of 0.048 lb./ton sodium cyanide and 2.8 lb./ton lime.

EXAMPLE 13

This example illustrates the beneficiation of a lead ore (1.85% Pb), using one of the promoters of the present invention.

600 grams of −10 mesh ore were ground for 6 minutes to 85% −65 mesh solids. Then 0.10 pound of p-menthane-2,9-dithiol and 0.07 pound of technical heptanol per ton of ore were added and the mixture was conditioned for 2 minutes, followed by flotation for 5 minutes. A concentrate, containing 48.3% of lead and representing a recovery of 89.8%, was obtained. This concentrate was conditioned for one minute and refloated for 3 minutes to yield a cleaner concentrate of 61.5% lead with a recovery of 75.9% of the lead.

EXAMPLE 14

The zinc ore described in Example 2 was ground and floated 3 minutes with 0.2 pound/ton toluenedithiol as promotor after activation with only 0.25 pound/ton copper sulfate. The resulting zinc concentrate assayed 50.7% Zn and represented a recovery of 97.1% of the zinc.

I claim:
1. In the process of separating zinc values from a zinc-sulfide containing ore which involves grinding said ore and subjecting the ground ore to froth flotation in the presence of a flotation promoter, the improvement which comprises using as a flotation promoter a dithiol compound of the formula HS—R—SH, where R is an aliphatic or alicyclic hydrocarbon radical having from 6 to 18 carbon atoms.

2. The process of claim 1 wherein the flotation is conducted at a pH in the range of 7.0 to 9.5.

3. The process of claim 1 wherein the flotation promoter is p-menthane-2,9-dithiol.

4. The process of claim 1 wherein the flotation promoter is 1,8-octanedithiol.

5. The process of claim 1 wherein the flotation promoter is 2,5-dimethylhexanedithiol-2,4.

References Cited

UNITED STATES PATENTS

| 1,839,155 | 12/1931 | Lubs | 209—166 |
| 1,904,460 | 4/1933 | Moses | 209—166 |
| 3,006,471 | 10/1961 | Luttinger | 209—166 |

HARRY B. THORNTON, Primary Examiner

R. HALPER, Assistant Examiner